(No Model.)

L. LOHMAN.
SAW.

No. 378,203. Patented Feb. 21, 1888.

Witnesses
Inventor
Louis Lohman
By his Attorney Chas J Gooch

UNITED STATES PATENT OFFICE.

LOUIS LOHMAN, OF JACKSONVILLE, FLORIDA.

SAW.

SPECIFICATION forming part of Letters Patent No. 378,203, dated February 21, 1888.

Application filed May 27, 1887. Serial No. 239,555. (No model.)

*To all whom it may concern:*

Be it known that I, LOUIS LOHMAN, a citizen of the United States, residing at Jacksonville, in the county of Duval and State of Florida, have invented certain new and useful Improvements in Saws; and I do hereby declare the following to be a full, clear, and exact description of the invention, such as will enable others skilled in the art to which it appertains to make and use the same.

This invention relates to improvements in the construction of saws.

The improvement consists in constructing the blades of reciprocating saws for various purposes with the teeth and edge adjacent thereto of greater thickness than the remaining portion of the blade, and in forming the respective sides of concave and gradually-tapering form from the points of the respective teeth to the opposite edge of the blade.

I am aware that it has been proposed to construct reciprocating saws with blades of gradual taper from the teeth to the rear edge, and that it has been proposed to construct circular saws with the tooth and central portion of a certain thickness gradually tapering from their edges inwardly and united by an intermediate concaved portion. In practice, when logs and other pieces of wood are sawed, the tendency of the dismembered pieces usually is to swell and come together. When that portion of the saw-blade rearwardly of the teeth is straight or tapering merely, the blade is apt to bind and, by reason of the accumulated sawdust and the resinous matter displaced from the wood during the sawing operation, become gummed and clogged in its movements, thus rendering the sawing operation more tedious and laborious than is desirable. Where the rear of the blade is of or about equal thickness to the toothed portion, the blade will, as it enters the wood, bind at its rear portion against the walls of the cutting formed by the saw, and thus necessitate the exertion of considerable force to propel the saw, which in such case binds against the wood at both its front and rear edges. According to my improvements I obviate each of these difficulties and disadvantages, as will presently appear.

Figure 1:
Figure 2:
Figure 3:
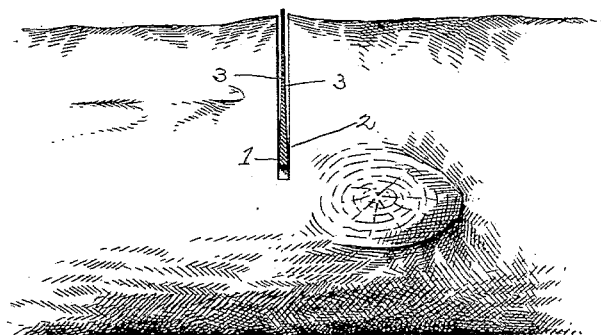
Figure 4:
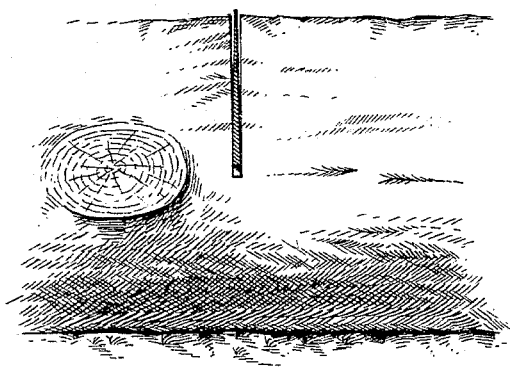
Figure 5:
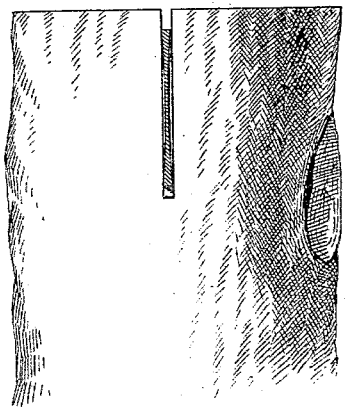

In the accompanying drawings, Figure 1 represents, on an enlarged scale, a vertical transverse section of a saw-blade constructed according to my invention. Fig. 2 represents a similar view, full size. Fig. 3 represents a detailed sectional view showing my improved saw in operation. Fig. 4 represents a similar view illustrating the manner in which a saw having a blade simply tapering from front to rear operates. Fig. 5 represents a similar view of the operation of a saw having thick front and rear edges and an intermediate concaved portion.

My improved saw-blade is formed with the front or toothed portion, 1, of a suitable thickness, according to the purposes for which it is to be used. From thence rearwardly the blade is ground or otherwise formed in gradually tapering and concave form on both sides from the points of the respective teeth to the rear edge, the extreme rear adjacent portion of the blade being thus rendered very thin as compared with the toothed portion, as clearly represented in the drawings. A saw-blade thus constructed according to my invention requires no setting of the teeth. All that is necessary when the teeth become dull is to file them.

In operation, as represented in Fig. 2, the sole point of binding or friction upon a saw thus constructed is upon the teeth and the thick portion of the blade adjacent thereto, the friction never extending beyond the point 2. All sawdust and gummy and resinous matter separated from the wood or other material in the operation of sawing are by the continued movement of the saw pushed rearwardly across the blade, the concaved form 3 of the sides, by reason of their absolute freedom from contact with the article being sawed, permitting of the free passage of such substances entirely across the blade. Thus a free passage rearwardly is afforded all matters displaced in the sawing operation, and all binding thereof upon the blade or between the blade and the material being sawed is prevented. Were the blade made tapering simply rearwardly the displaced sawdust and resinous matter could not pass as freely across the blade of the saw as is the case where the sides of the blade are also of concave form. The concaved sides 3 form curved conduits or ways, along or across which the displaced material can more readily slide and be discharged than is possible where the blade sides are straight or plane surfaced. Were the blade formed with front and rear of a given thickness and an intermediate concaved portion, not only would the blade bind at both of those points, but the sawdust would accumulate within such intermediate concaved portions and cause the binding of the saw and render it quite difficult of operation.

By my construction I secure the free movement of the saw at all times, prevent the binding thereof at any point, reduce the friction to the minimum, and insure the automatic discharge and removal from the saw-blade of all sawdust and resinous substances displaced during the sawing operation.

Having now described my invention, what I claim is—

1. A reciprocating saw-blade having concaved and gradually-tapering sides from the points of the teeth to its opposite edge.

2. A saw-blade of taper form transversely from the points of the teeth to the rear edge of the blade and having concaved side faces, substantially as set forth.

In testimony whereof I affix my signature in presence of two witnesses.

LOUIS LOHMAN.

Witnesses:
CHAS J. GOOCH,
S. A. TERRY.